(12) United States Patent
Hansen (10) Patent No.: US 12,492,002 B2
(45) Date of Patent: Dec. 9, 2025

(54) FLOOR SEAL FOR ACCOMMODATING DYNAMIC FLOOR MOTION IN AN AIRCRAFT OR OTHER CONVEYANCE

(71) Applicant: AMI Industries, Inc., Colorado Springs, CO (US)

(72) Inventor: Brian C. Hansen, Colorado Springs, CO (US)

(73) Assignee: AMI Industries, Inc., Colorado Springs, CO (US)

(*) Notice: Subject to any disclaimer, the term of this patent is extended or adjusted under 35 U.S.C. 154(b) by 97 days.

(21) Appl. No.: 18/536,696

(22) Filed: Dec. 12, 2023

(65) Prior Publication Data

US 2025/0187736 A1 Jun. 12, 2025

(51) Int. Cl.
*B64D 11/06* (2006.01)
*B60J 10/27* (2016.01)

(52) U.S. Cl.
CPC .......... *B64D 11/0696* (2013.01); *B60J 10/27* (2016.02); *B64D 11/06* (2013.01); *B64D 11/0648* (2014.12)

(58) Field of Classification Search
CPC . B64D 11/06; B64D 11/0648; B64D 11/0696; A47B 31/00; A47B 31/06; A47B 27/14; B61D 37/00; B61D 33/0064; B61D 33/0071
See application file for complete search history.

(56) References Cited

U.S. PATENT DOCUMENTS

| | | | |
|---|---|---|---|
| 4,897,891 | A | 2/1990 | Kallman et al. |
| 5,149,569 | A | 9/1992 | Mccue |
| 6,655,440 | B2 | 12/2003 | Brunk |
| 8,287,041 | B2 | 10/2012 | Paulin |
| 9,340,291 | B2 | 5/2016 | Nestel et al. |
| 10,384,579 | B1 | 8/2019 | Wanner et al. |
| 11,787,546 | B2 | 10/2023 | Jayaramu et al. |
| 2017/0152062 | A1 | 6/2017 | Sontag et al. |

(Continued)

FOREIGN PATENT DOCUMENTS

JP 2013246077 A 12/2013

OTHER PUBLICATIONS

AppliancePartsPros, How to Fridigaire/Electrolux Kickplate Grille, Mar. 3, 2017, YouTube, [youtube.com/watch?v=U1sAZs2MUBs] (Year: 2017).*

(Continued)

*Primary Examiner* — Nicholas McFall
*Assistant Examiner* — Justin Michael Heston
(74) *Attorney, Agent, or Firm* — Suiter Swantz IP (57) ABSTRACT

A floor seal assembly for use with furniture configured to be mounted spaced above a movable floor. In embodiments, the floor seal assembly includes a seal carrier that is elongated in a longitudinal direction, defines a clearance at each opposing longitudinal end configured to be positioned in surrounding relation and out of contact with mounting hardware, and includes an upstanding peripheral rim supporting a lateral side of a foam seal mounted to the bottom of the seal carrier. In use, the floor seal assembly closes off a gap formed between the mounted furniture and the floor to prevent food, waste, and other debris from migrating and accumulating under the furniture. In embodiments, the furniture is a cabin attendant seat in an aircraft.

15 Claims, 6 Drawing Sheets

(56) References Cited

U.S. PATENT DOCUMENTS

2018/0049558 A1    2/2018  Jurcenko
2018/0148176 A1*   5/2018  Rodriguez ......... B64D 11/0638

OTHER PUBLICATIONS

Tape Jungle, Foam Tape: A Complete Guide, Jul. 29, 2022, [web.archive.org/web/20230323141647/https://www.tapejungle.com/news/foam-tape-a-complete-guide/] (Year: 2022).*
FoamTapes.Net, Jun. 24, 2021, [web.archive.org/web/20210624035645/https://foamtapes.net/shopallfoamtapes.aspx] (Year: 2021).*
European Search Report received in EP Application No. 24213300.7, May 15, 2025, 9 pages.

* cited by examiner

FLOOR SEAL FOR ACCOMMODATING DYNAMIC FLOOR MOTION IN AN AIRCRAFT OR OTHER CONVEYANCE

TECHNICAL FIELD AND BACKGROUND

The present disclosure relates generally to a floor seal assembly for furniture mounted in an aircraft or other conveyance, and more particularly, to a floor seal assembly configured to accommodate mounting hardware and floor movement during a dynamic event.

Furniture in aircraft and other conveyances is typically mounted to the floor to secure the furniture in place. Furniture may include, but is not limited to, passenger seats, cabin attendant seats, pilot seats, interior walls, partitions, monuments, etc. Furniture may be mounted to the floor, directly or indirectly through seat tracks, using track fasteners or other mounting hardware.

The floor in a conveyance such as an aircraft may flex, twist, or otherwise warp during motion of the aircraft, and particularly during a dynamic event. In use, the track fasteners or other mounting hardware are configured to accommodate floor movements. To avoid direct loading on the furniture, and in particular loading on hard surfaces, the furniture is typically spaced above the floor by a small distance or "stand-off" distance. The stand-off distance results in a gap being formed between the floor and the bottom of the furniture. The gap presents an opportunity for food, waste, and other debris to migrate and accumulate under the furniture. Considering the small stand-off height and mounting hardware, adequate cleaning requires uninstalling the furniture from its attachment to the floor.

Therefore, what is needed is a solution for sealing the stand-off gap formed under furniture in conveyances to facilitate cleanability.

BRIEF SUMMARY

In an aspect, embodiments of the inventive concepts disclosed herein are directed to a floor seal assembly for use with furniture configured to be mounted spaced above a floor. In embodiments, the floor seal assembly includes a seal carrier configured to be mounted to a bottom surface of the furniture. In embodiments, the seal carrier is elongated in a longitudinal direction, defines a first clearance at a first longitudinal end and a second clearance at a second longitudinal end, each clearance configured to be positioned in surrounding relation and out of contact with mounting hardware for attaching the furniture to the floor, includes a transverse plate positioned between the first clearance and the second clearance, and includes an upstanding rim positioned on a bottom surface of the seal carrier, the upstanding rim extending from the first longitudinal end to the second longitudinal end. In embodiments, the floor seal assembly further includes a foam seal mounted to the bottom surface of the seal carrier, the foam seal extending from the first longitudinal end to the second longitudinal end, and the foam seal supported along one lateral side by the upstanding rim.

In some embodiments, a middle portion of the seal carrier is linear and each of the first and second longitudinal ends is curved.

In some embodiments, the seal carrier is aluminum, the foam seal is adhesively bonded to the bottom of the seal carrier, and the foam seal includes closed cell foam or open cell foam coated on at least two adjacent sides.

In some embodiments, the upstanding rim is positioned along an outer peripheral edge of the bottom surface.

In some embodiments, the transverse plate extends in a direction away from the upstanding rim.

In some embodiments, each of the upstanding rim and the foam seal are continuous along their respective length.

In some embodiments, the foam seal extends beyond the upstanding rim a distance between about 0.25 inches and 1.00 inch.

In another aspect, embodiments of the inventive concepts disclosed herein are directed to a furniture assembly configured to be mounted to a floor in a conveyance. In embodiments, the furniture assembly includes furniture, mounting hardware attached to a bottom of the furniture and attachable to a floor, the mounting hardware configured to position the furniture spaced above the floor, and a floor seal assembly configured to close a gap between the floor and bottom of the furniture. In embodiments, the floor seal assembly includes a seal carrier mounted to the bottom of the furniture, and a foam seal mounted to a bottom surface of the seal carrier. In embodiments, the seal carrier is elongated in a longitudinal direction, defines first and second clearances at opposing longitudinal ends each configured to be positioned in surrounding relation and out of contact with the mounting hardware, and includes an upstanding rim positioned on a bottom surface of the seal carrier, the upstanding rim extending from the first longitudinal end to the second longitudinal end, and the upstanding rim supporting the foam seal along one lateral side of the foam seal.

In a further embodiment, embodiments of the inventive concepts disclosed herein are directed to a cabin attendant seat (CAS) assembly configured to be mounted to a floor in an aircraft. In embodiments the assembly includes a CAS, mounting hardware attached to a bottom of the CAS and attachable to the floor, the mounting hardware configured to position the CAS spaced above the floor, and a floor seal assembly configured to close the stand-off distance between the bottom of the CAS and the floor.

This summary is provided solely as an introduction to subject matter that is fully described in the following detailed description and drawing figures. This summary should not be considered to describe essential features nor be used to determine the scope of the claims. Moreover, it is to be understood that both the foregoing summary and the following detailed description are explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description refers to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a floor seal assembly and furniture assemblies including a floor seal assembly. In use, the floor seal assembly mounts to a bottom of the furniture, for instance to a bottom surface, the bottom of a hardpoint structural side panel, etc. The seal assembly generally includes a rigid seal carrier and an attached foam seal that operates to create a soft barrier between the bottom of the furniture and the floor to block the ingress of debris. In embodiments, the bottom of the seal carrier has a peripheral rim configured to securely retain the foam seal along the profile of the seal carrier. The seal carrier is shaped to avoid contact with the mounting hardware of the furniture while substantially surrounding the mounting hardware, thereby allowing the seal assembly to avoid contact with a moving floor. In embodiments, the seal carrier is configured to fit around the profile of a side panel around where the side panel mounts for additional strength and to complement the cosmetic appearance of the furniture, such as a cabin attendant seat (CAS).

Benefits of the seat assembly according to the present disclosure include, but are not limited to, the creation of a soft and compliant foam seal between the bottom of the furniture and the floor to prevent the ingress of debris, and a soft seal that allows for movement of the floor and mounting hardware during a dynamic event without inducing unexpected loads through the sealing system. In embodiments, the seal carrier fits around and mounts to furniture side panels to improve the cosmetic appearance of the furniture, and the foam seal can easily be replaced in the field while reusing the carrier.

Figure 1:
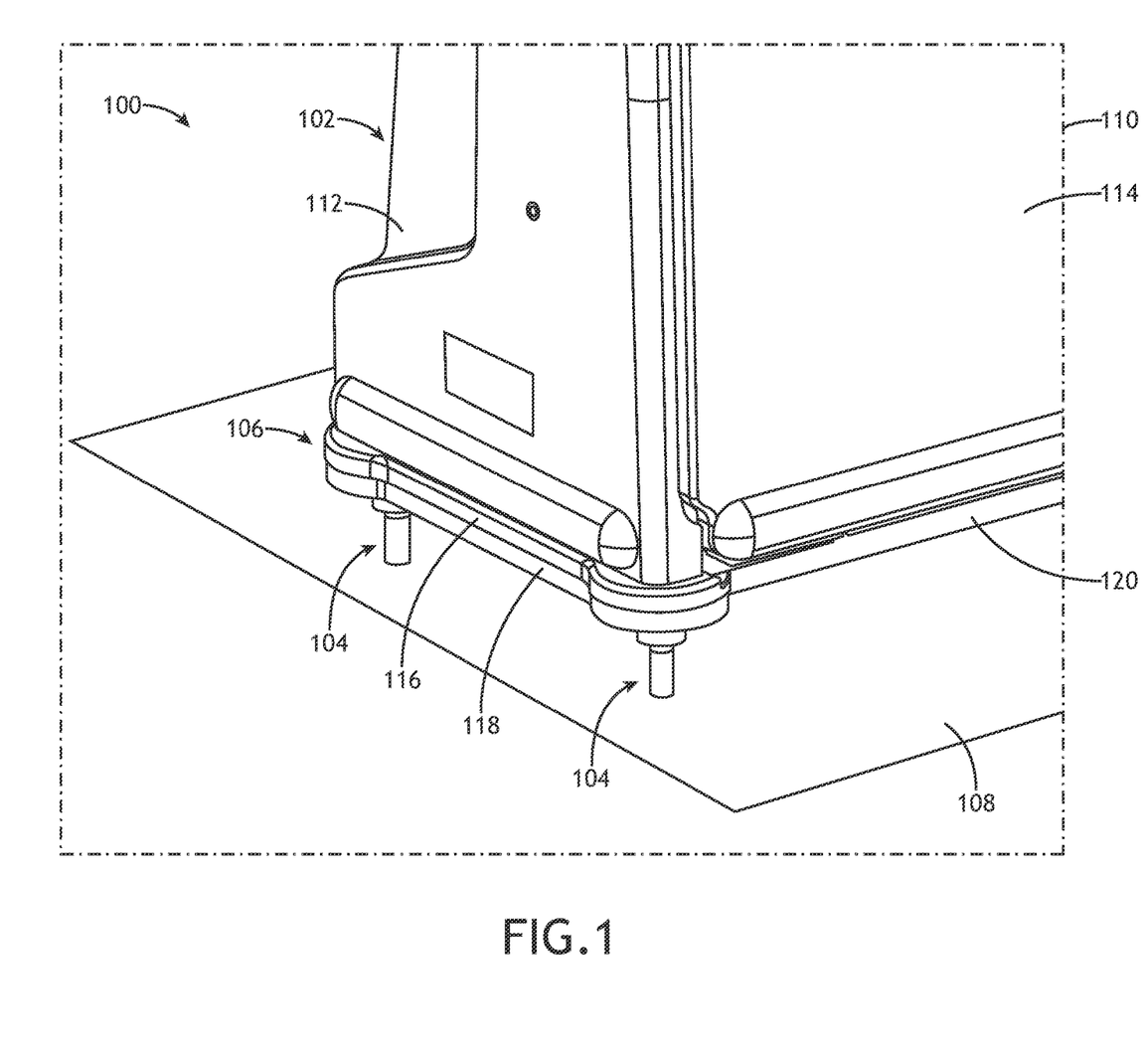
FIG. 1 is a perspective view of a furniture assembly shown mounted to a floor and including furniture, mounting hardware, and a floor seal assembly, in accordance with example embodiments of this disclosure.

FIG. 1 is a perspective view of a furniture assembly 100, in accordance with example embodiments of this disclosure. The furniture assembly 100 generally includes furniture 102, mounting hardware 104, and a seal assembly 106. The furniture 102 is configured to be mounted, by the mounting hardware 104, to a floor 108 such that the bottom of the furniture 102 is spaced above and out of contact with the floor 108. The term floor as used herein may mean the floor of a conveyance, an embedded seat track, or any other structure to which the mounting hardware 104 attaches to secure the furniture 102 in place.

FIG. 1 shows the seal assembly 106 in the context of a cabin attendant seat (CAS) 110 mountable to the floor 108 of an aircraft. While a CAS 110 is shown, other furniture in the context of an aircraft may include, but is not limited to, pilot seats, passenger seats, interior walls, partitions, and monuments. As shown, the mounting hardware 104 is attached to the CAS 110 and to the floor 108. The CAS 110 includes a hardpoint structural side panel 112 and a stowage box door 114. The CAS 110 may include additional panels such as an opposite side panel, back closeout panel, etc. As installed, the hardpoint structural side panels are spaced above the floor 108 such that movement of the floor 108 and the mounting hardware 104 during a dynamic event can occur without hard contact between the CAS 110 and the floor 108, which could introduce unexpected loads to the mounting hardware 104.

The seal assembly 106 generally includes a seal carrier 116 and a foam seal 118 configured to avoid movement of both the mounting hardware 104 and the floor 108 due to floor warpage during a dynamic event. In embodiments, the seal carrier 116 is rigid and the foam seal 118 is compliant. In particular embodiments, the seal carrier 116 may be aluminum and the foam seal 118 may be made from closed cell foam, open cell foam, and combinations thereof. In some embodiments, the open or closed cell foam may be coated on at least one side, and preferably on adjacent sides such as the exterior facing side (e.g., aisle facing) and the bottom (e.g., facing the floor) to make the foam seal hydrophobic. In embodiments, the foam seal 118 may be adhesively bonded to the seal carrier 116 to facilitate replacement as needed.

As shown, the seal carrier 116 may be radiused at its opposing longitudinal ends to accommodate the mounting hardware 104 and complement the CAS cosmetics. As shown, the seal carrier 116 mates with the CAS hardpoint structural side panel 112 for comprehensive sealing, and stops short of the stowage box door 114 in the context of a CAS including integrated storage. While one side of the CAS 110 is shown including one seal assembly 106, it is envisioned that seal assemblies 106 may be provided on both sides of the CAS 110 in a symmetrical or asymmetrical configuration. In embodiments, free standing foam strips 120 may be attached to the bottom of the front and back panels to mate with the foam strips of the seal assemblies 106 to substantially seal the entire perimeter along the bottom of the CAS 110.

Figure 2:
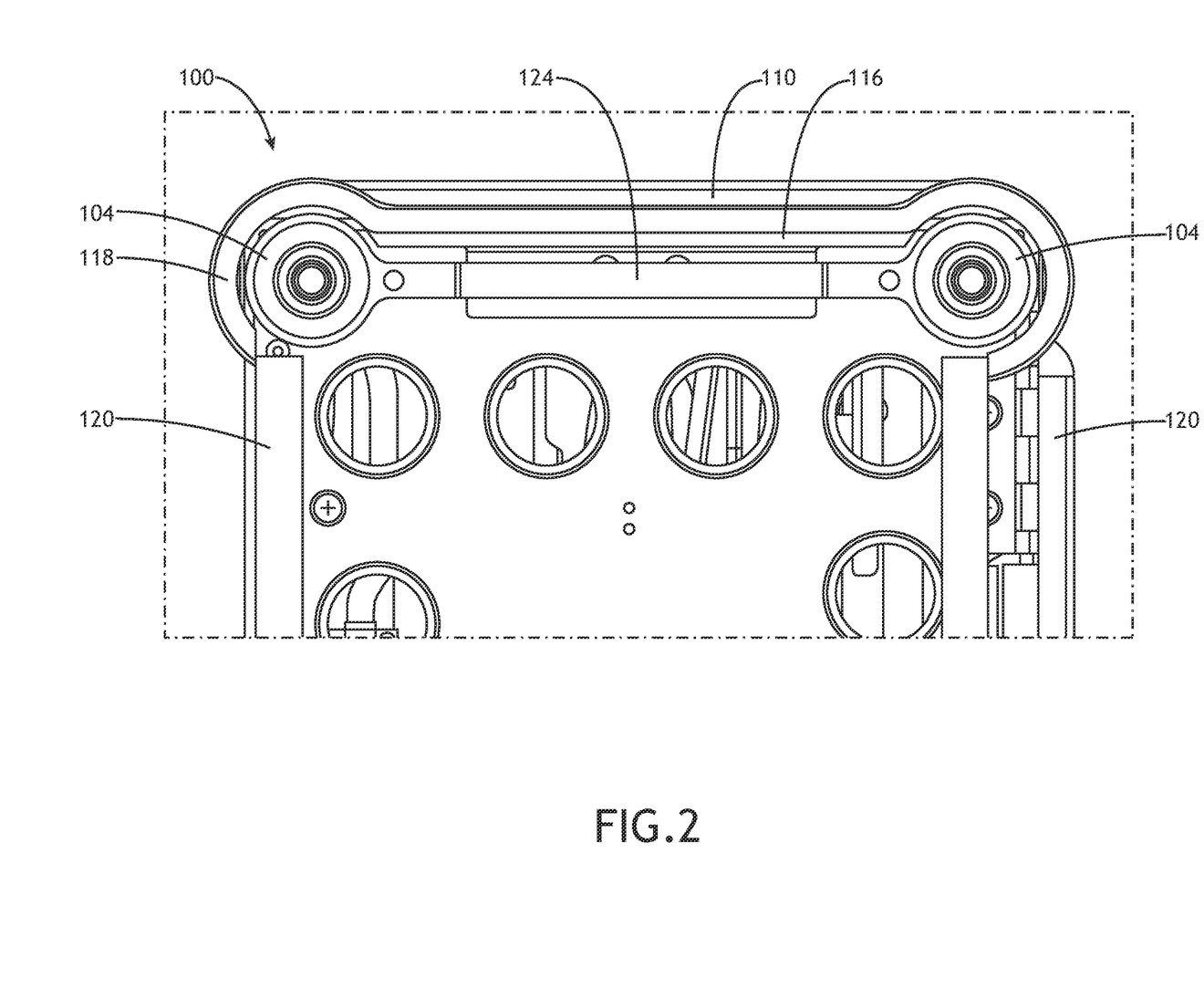
FIG. 2 is a bottom fragmentary view of the furniture assembly of FIG. 1.

FIG. 2 is a bottom view of the furniture assembly 100. In embodiments, the CAS 110 includes a bottom panel 122 and the seal carrier 116 attaches to the bottom panel 122. The mounting hardware 104 may be positioned at each corner and may include an elongated connecting link 124. As shown, the seal carrier 116 is mounted to the bottom panel 122, above the connecting link 124, and free of any direct contact with the mounting hardware 104. In embodiments, the seal carrier 116 clears the mounting hardware 104 with additional room for the mounting hardware 104 to pivot or otherwise move as designed. The seal carrier 116 has a profile, which may be customized to the furniture, and the foam seal 118 is installed to follow the profile of the seal carrier 116. FIG. 2 further shows the foam strips 120 positioned at the 'front' and 'back' of the CAS 110 to mate with the foam seal 118 positioned at the sides to form a complete bottom perimeter seal.

Figure 3:
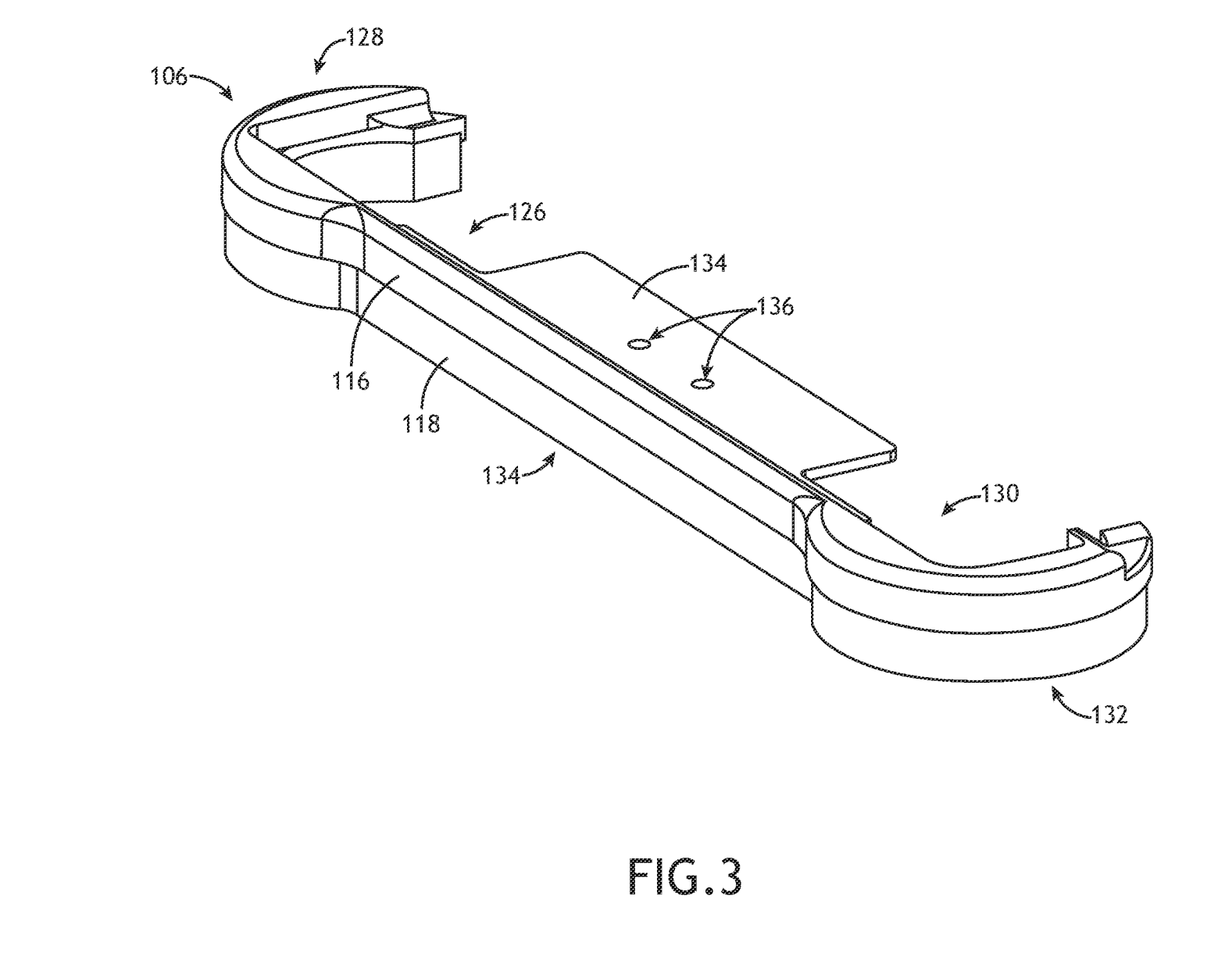
FIG. 3 is a top perspective view of a floor seal assembly, in accordance with example embodiments of this disclosure.

FIG. 3 is a top perspective view of the seal assembly 106, in accordance with example embodiments of this disclosure. As stated above, the seal assembly 106 generally includes the seal carrier 116 and the foam seal 118. As shown, the seal carrier 116 is elongated in a longitudinal direction to span, for example, spaced mounting hardware of a CAS. A first clearance 126 is positioned proximal to a first longitudinal end 128 of the seal carrier 116, and a second clearance 130 is positioned proximal to a second longitudinal end 132 of the seal carrier 116. Each of the first and second clearances 126, 130 is configured to receive and be positioned in surrounding relation to mounting hardware, without physical contact with the mounting hardware.

As shown, the seal carrier 116 has an elongated linear middle portion 134 and curved first and second ends 128, 132 shaped according to the corresponding furniture shape. A transverse plate 134, positioned between the first and second clearances 126, 130, at substantially the middle of the seal carrier 116, extends 'inward' and includes thru holes 136 for receiving fasteners for mounting the seal carrier 116 to the furniture, for instance the bottom panel 122 as shown in FIG. 2. The foam seal 118, for instance in the form of a flexible strip, can be applied to follow the profile of the seal carrier. In embodiments, the foam seal 118 extends beyond the seal carrier 116 a predefined distance which can be determined by the stand-off distance of the mounted furniture. For example, the foam seal 118 may extend about 0.25 inches to about 1.00 inch beyond the seal carrier 116 (e.g., toward the floor), and in some cases may be more, and in some cases may be less depending on the application.

Figure 4:
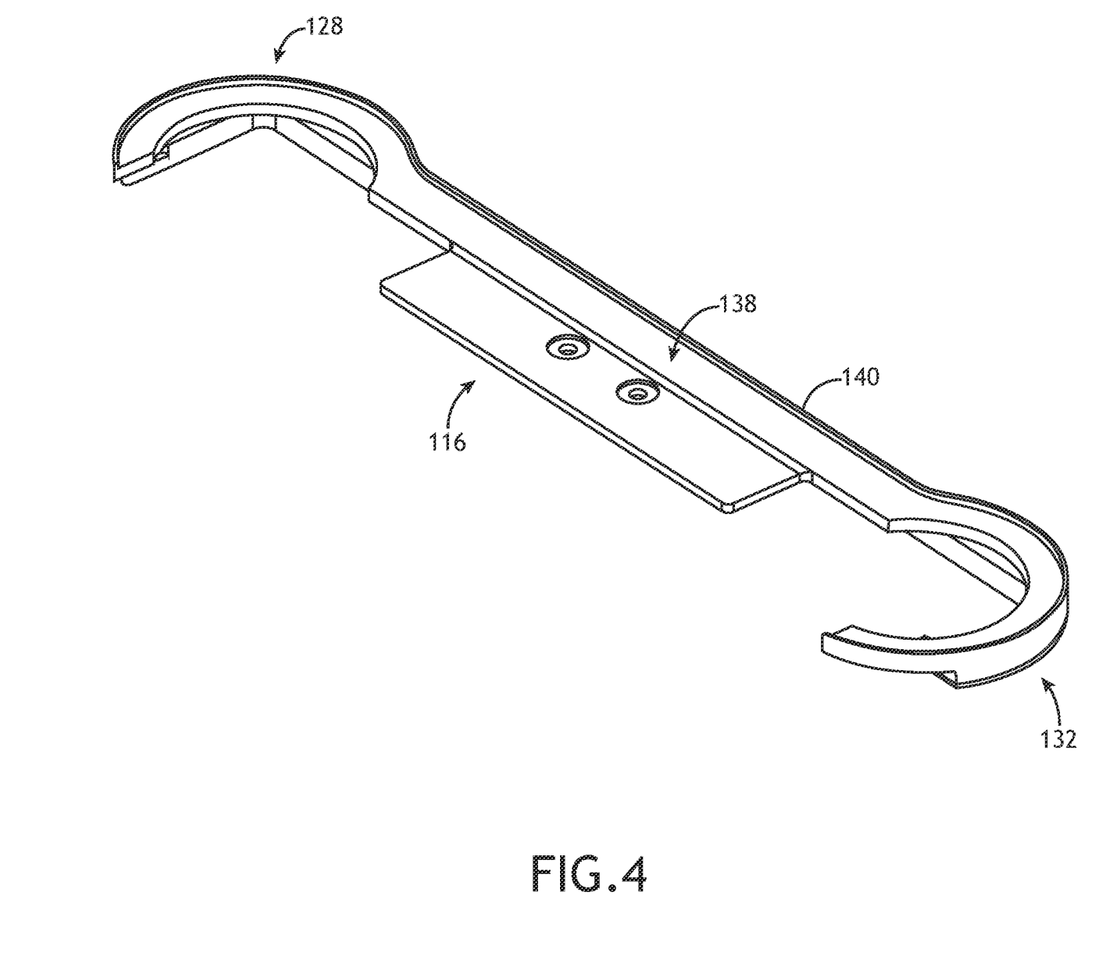
FIG. 4 is a bottom perspective view of the seal carrier shown without the foam seal.

FIG. 4 is a bottom perspective view of the seal carrier 116 shown without the foam seal. The bottom surface 138 of the seal carrier 116 includes an upstanding rim 140 positioned along an outer peripheral edge of the seal carrier 116. In embodiments, the upstanding rim 140 is continuous from the first longitudinal end 128 to the second longitudinal end 132. In use, the upstanding rim 140 functions to guide the shape of the foam seal and support the foam seal along one lateral side of the foam seal. The bottom surface 138, inward of the upstanding rim 140, is preferably flat and wide enough to seat and support the thickness of the foam seal.

Figure 5:
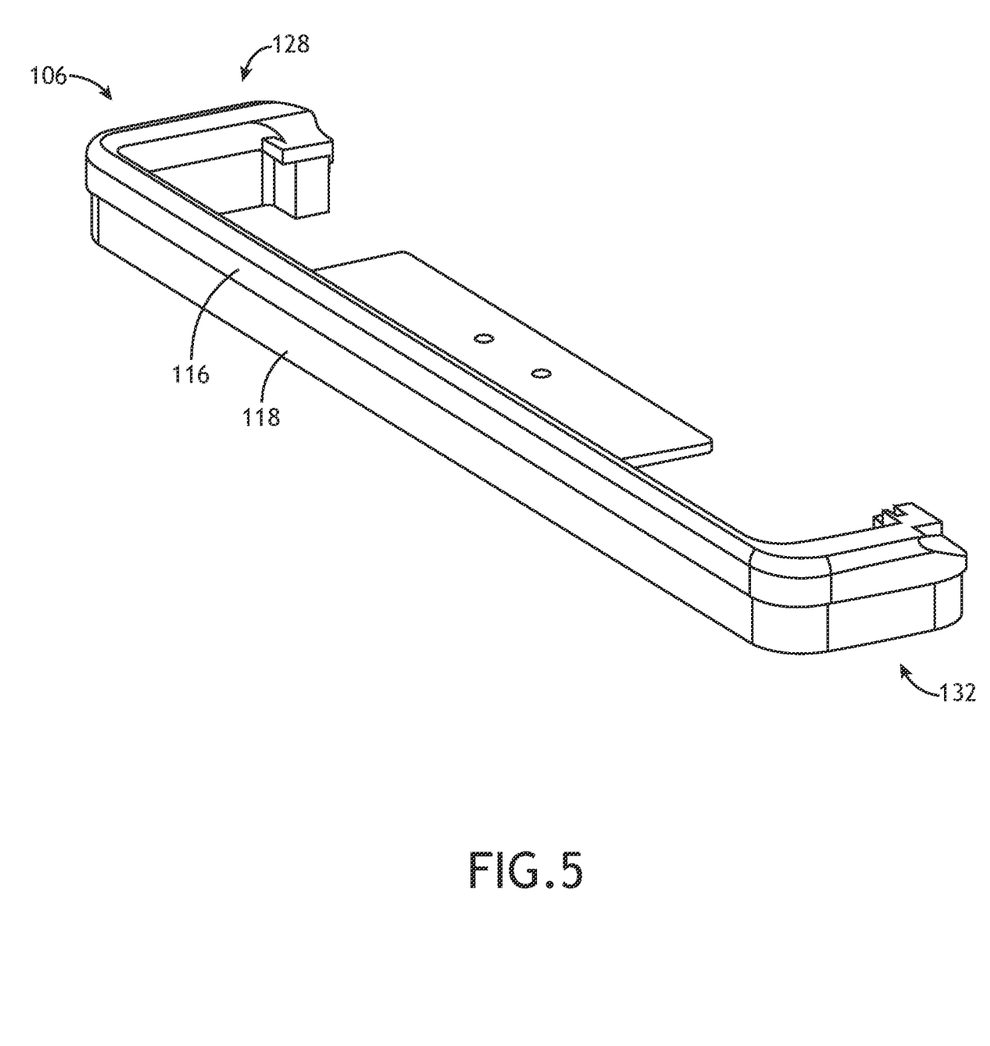
FIG. 5 is a top perspective view of a floor seal assembly having an alternative shape, in accordance with example embodiments of this disclosure.

FIG. 5 is a top perspective view of the seal assembly 106 having an alternative shape. As shown, the first and second longitudinal ends 128, 130 are substantially rectangular shaped with rounded corners such that the side of the seal carrier 116, and consequently the foam seal 118, is substantially linear. As stated above, the shape of the seal carrier 116 is entirely customizable in length, width, curvature, etc., to correspond to the shape of the furniture. In embodiments, the seal carrier 116 may be symmetrical or asymmetrical about each of its lateral and longitudinal axes.

Figure 6:
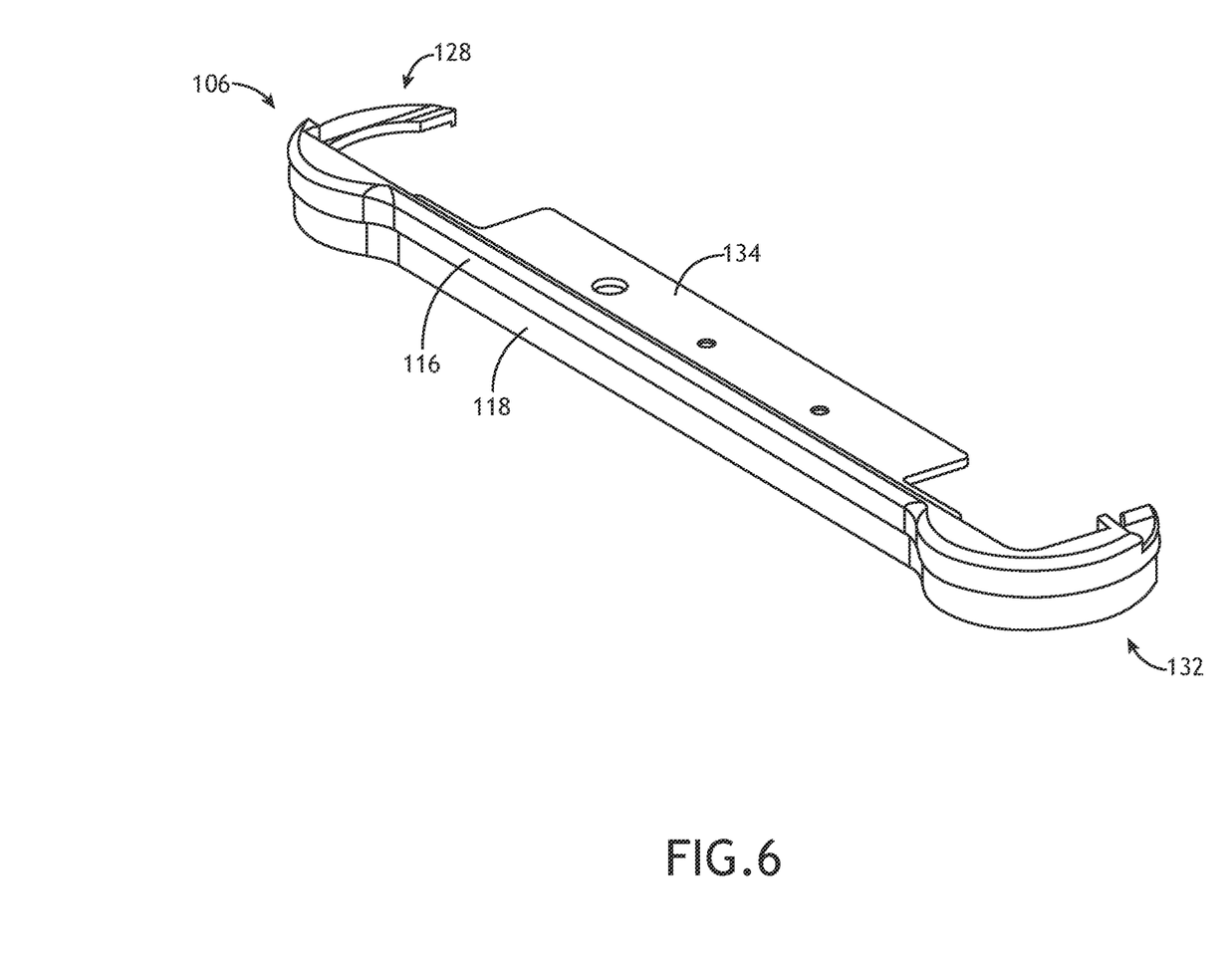
FIG. 6 is a top perspective view of a floor seal assembly having yet another alternative shape, in accordance with example embodiments of this disclosure.

FIG. 6 is a top perspective view of the seal assembly 106 having another alternative shape. As shown, the first and second longitudinal ends 128, 130 are radiused to provide a 'dog bone' shape. Again, the shape of the seal carrier 116 is entirely customizable in length, width, curvature, etc., to correspond to the shape of the furniture. In embodiments, the seal carrier 116 may be symmetrical or asymmetrical about each of its lateral and longitudinal axes. The shape of the transverse plate 134 is also customizable to conform to the attachment structure of the furniture.

From the above description, it is clear that the inventive concepts disclosed herein are well adapted to achieve the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A floor seal assembly for use with furniture configured to be mounted spaced above a floor, the floor seal assembly comprising:
    a seal carrier configured to be mounted to a bottom of the furniture, wherein seal carrier:
        is elongated in a longitudinal direction;
        defines a first clearance at a first longitudinal end and a second clearance at a second longitudinal end, each clearance configured to be positioned in surrounding relation and out of contact with mounting hardware for attaching the furniture to the floor;
        includes a transverse plate positioned between the first clearance and the second clearance; and
        includes an upstanding rim positioned on a bottom surface of the seal carrier, the upstanding rim extending from the first longitudinal end to the second longitudinal end; and
    a foam seal mounted to the bottom surface of the seal carrier, the foam seal extending from the first longitudinal end to the second longitudinal end, the foam seal supported along one lateral side by the upstanding rim, the foam seal comprising closed cell foam or open cell foam coated on at least two adjacent sides, and the foam seal extending beyond the upstanding rim a distance between 0.25 inches and 1.00 inch.

2. The floor seal assembly according to claim 1, wherein a middle portion of the seal carrier is linear and each of the first and second longitudinal ends is curved.

3. The floor seal assembly according to claim 1, wherein the foam seal is adhesively bonded to the bottom of the seal carrier.

4. The floor seal assembly according to claim 1, wherein the upstanding rim is positioned along an outer peripheral edge of the seal carrier.

5. The floor seal assembly according to claim 4, wherein the transverse plate extends inward from the upstanding rim.

6. The floor seal assembly according to claim 1, wherein the upstanding rim and the foam seal are each continuous along their respective length.

7. A furniture assembly configured to be mounted to a floor in a conveyance, the furniture assembly comprising:
furniture;
mounting hardware attached to a bottom of the furniture and attachable to a floor, the mounting hardware configured to position the furniture spaced above the floor; and
a floor seal assembly comprising:
a seal carrier mounted to the bottom of the furniture, wherein the seal carrier is elongated in a longitudinal direction, defines first and second clearances at opposing longitudinal ends each configured to be positioned in surrounding relation and out of contact with the mounting hardware, and includes an upstanding rim positioned on a bottom surface of the seal carrier, the upstanding rim extending from the first longitudinal end to the second longitudinal end; and
a foam seal mounted to the bottom surface of the seal carrier, the foam seal extending from the first longitudinal end to the second longitudinal end, and the foam seal supported along one lateral side by the upstanding rim;
wherein the foam seal comprises closed cell foam coated on at least two adjacent sides, and the foam seal extends beyond the upstanding rim a distance between 0.25 inches and 1.00 inch.

8. The furniture assembly according to claim 7, wherein a middle portion of the seal carrier is linear and each of the first and second longitudinal ends is curved.

9. The furniture assembly according to claim 7, wherein the seal carrier includes a transverse plate positioned between the first and second clearances.

10. The furniture assembly according to claim 7, wherein the upstanding rim is positioned and extends continuously along an outer peripheral edge of the seal carrier.

11. The furniture assembly according to claim 7, wherein the furniture is a passenger seat, a pilot seat, a cabin attendant seat, an interior wall, a partition, or a monument.

12. A cabin attendant seat assembly configured to be mounted to a floor in an aircraft, the cabin attendant seat assembly comprising:
a cabin attendant seat;
mounting hardware attached to a bottom of the cabin attendant seat and attachable to a floor, the mounting hardware configured to position the cabin attendant seat spaced above the floor; and
a floor seal assembly comprising:
a seal carrier mounted to the bottom of the cabin attendant seat, wherein the seal carrier is elongated in a longitudinal direction, defines first and second clearances at opposing longitudinal ends each configured to be positioned in surrounding relation and out of contact with the mounting hardware, and includes an upstanding rim positioned on a bottom surface of the rigid carrier, the upstanding rim extending from the first longitudinal end to the second longitudinal end; and
a foam seal mounted to the bottom surface of the seal carrier, the foam seal extending from the first longitudinal end to the second longitudinal end, and the foam seal supported along one lateral side by the upstanding rim;
wherein the foam seal comprises closed cell foam coated on at least two adjacent sides, and the foam seal extends beyond the upstanding rim a distance between 0.25 inches and 1.00 inch.

13. The cabin attendant seat assembly according to claim 12, wherein a middle portion of the seal carrier is linear and each of the first and second longitudinal ends is curved.

14. The cabin attendant seat assembly according to claim 12, wherein the seal carrier includes a transverse plate positioned between the first and second clearances.

15. The cabin attendant seat assembly according to claim 12, wherein the upstanding rim is positioned and extends continuously along an outer peripheral edge of the seal carrier.

* * * * *